Feb. 9, 1960 N. B. HAST 2,924,094
APPARATUS FOR MEASURING STRESSES WITHIN
CONCRETE BUILDING STRUCTURES
Filed Jan. 3, 1956 2 Sheets-Sheet 1
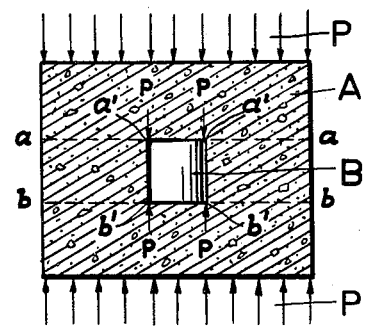
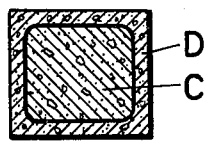
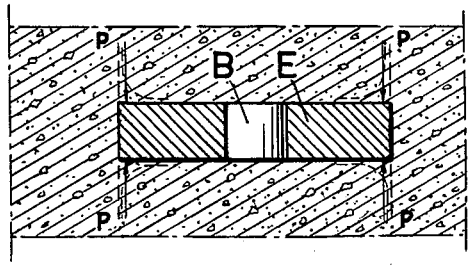
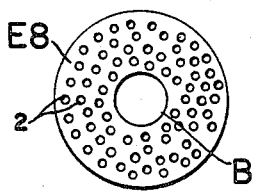
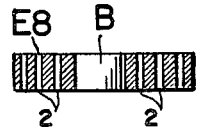
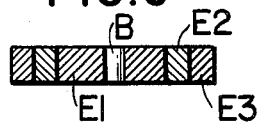
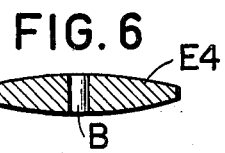
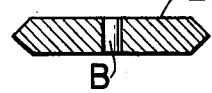
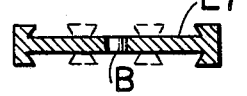
INVENTOR.
Nils Bernhard Hast,
BY
Pierce, Scheffler & Parker
his Attorneys

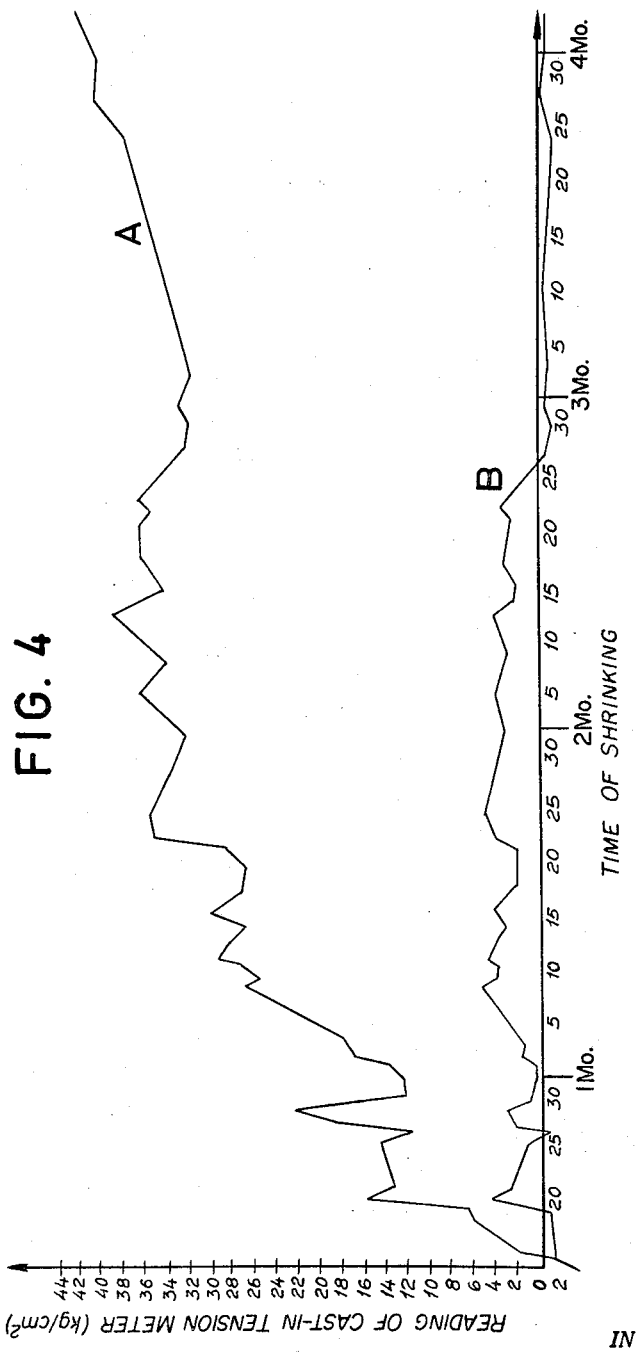

United States Patent Office 2,924,094
Patented Feb. 9, 1960

2,924,094

APPARATUS FOR MEASURING STRESSES WITHIN CONCRETE BUILDING STRUCTURES

Nils Bernhard Hast, Stockholm, Sweden

Application January 3, 1956, Serial No. 557,191

7 Claims. (Cl. 73—88)

The present invention relates to apparatus for measuring internal stresses and more particularly to an improved arrangement for a testing device adapted to be permanently embedded in a mass of concrete or like material for measuring stresses which arise internally in the mass.

It is a particular object to provide an arrangement for measuring internal stresses produced within a mass of concrete by externally applied loads in a more accurate manner. In particular, it is an object to provide a stress measuring arrangement wherein the testing device per se is rendered non-responsive to internal stress components which are not related to actual external loading of the concrete itself, such components arising for example due to shrinkage and plastic deformation incidental to aging of the concrete.

Generally speaking, the objective of the inventive concept is attained by closely surrounding a test cell of any conventional construction with a disc or ring which has the same modulus of elasticity and substantially the same coefficient of temperature expansion as those of the test cell itself.

Measuring stress meters, or "cells" for recording stresses have been a long-felt want, both for recording stresses in concrete test bodies in laboratories and in finished structures and buildings, for example in bridges, dams, and foundation structures, and in different parts of a building, such as walls, pillars and joists. Particularly since concrete has now become our most important building material there is a great need for such measuring cells to be embedded in the concrete mass at the time the mass is moulded, i.e. poured. Concrete structures made now can only be calculated approximately, partly due to the fact that concrete in itself is not isotropic, and partly due to the fact that the material in course of time will change and be given other properties than those it had from the beginning, and on which the calculation of the structure was based. The concrete shrinks and expands and is subject to considerable plastic deformations in a way that cannot be definitely foreseen and which is intimately connected with the moisture and the temperature of the ambient air, but also with the quality of the concrete, for example in case too much water is used, if the concrete flooring dries too fast et cetera. A reinforced concrete which extends continuously over several supports, will from the beginning be calculated with a certain supposed magnitude of the negative support moments and the positive field moments. These will certainly change considerably in connection with the drying of the flooring, but it is not known to what extent. There only seems to be one possibility, thus, to cast-in measuring cells, recording stresses, into different parts of the concrete slab and observe the course by means of these cells. The term "cast-in" as applied to the stress meter or measuring cell as used hereafter in the description and claims means that the stress meter or measuring cell is embedded in the concrete mass at the time of moulding, i.e. when the mass is poured. Other examples are the distribution of shrinking stresses in concrete walls, outer walls as well as inner walls. In a reinforced concrete pillar a successive increase in the load in the longitudinal reinforcement will arise due to shrinking and plastic deformation of the concrete material. The distribution of moments in a bridge arch is certainly subject to essential changes due to the shrinking and the plastic deformation of the concrete. In massive structures, such as dams, the calculated internal distribution of stress will be changed due to stresses caused by decrease of temperature, which is due to the fact that the cement of the concrete generates heat when solidifying.

One may wonder why there are no suitable stress meters on the market, if the want is so great. As a matter of fact, stress meters are available, see for example Swedish patent specification No. 117,422. The difficulties lie therein that the meters are not fit for use in a stiff material, such as concrete, in which, in addition to elastic deformations, there also occurs a great degree of motion in the material caused by shrinking, swelling and plastic deformation. It may be added that the latter group as a rule gives greater motion to the rigid material than the motion caused by load by elastic contraction of the material, even when the load is so great that the material is strained to the rupture limit.

In the drawings Figure 1 shows a concrete body A provided with a cast-in stress meter or measuring cell B, the said concrete body being loaded at its end surfaces with $p$ kg./cm.$^2$. The cast-in measuring cell is supposed to record correctly $p$ kg./cm.$^2$. The measuring cell B need not be of any particular construction and can be of conventional design as shown for example in United States Patent No. 2,036,458, granted April 7, 1936 to R. W. Carlson. If the concrete shrinks or is subject to plastic deformation while carrying the load—as concrete does—this means that the height of the concrete layer between the lines a—a and b—b will be reduced. Consequently the concrete will stick in the points a' and b' at the corners or edges of the measuring cell, that is, the measuring cell is influenced additionally by the pressure forces P thus arising, which may be said to be a local tension due to the material sticking to the cell, which additional stress is not a real stress in the structure. On expansion, P acts instead as tensile force on the cell.

The measuring cell records partly the evenly distributed load $p$ kg./cm.$^2$ from the external load on the concrete body and partly the sum of the tensile forces P around the cell. As the latter may be considerably great and sometimes entirely overshade the load $p$, the measurement will be incorrect and of no practical value. In places where pressure stress is prevalent, for instance in the upper edge of a freely laid concrete slab, stress meters cast-in will record too high a stress at the top and accordingly the wrong magnitude of the stress at the lower end of the slab, as in the latter case the tensile stress is compensated by the forces exerted on the cell by the shrinking of the material round the cell. Thus it is quite impossible, for example in a continuous concrete joist, to study and observe a continued change of the positive and negative moments.

Still another example will be given which shows in a drastic way the extent to which incorrect measurements result from use of the prior known techniques with cast-in cells.

If, for example, such a measuring cell is placed at the edge of a concrete pillar, it will record great stresses, even if the pillar is not loaded, since the concrete shrinks after solidifying, when water is emitted, and at this deformation of the material the cell, according to Figure 1, must indicate pressure. However, it is a well-known matter that, for example a concrete pillar in a structure at the beginning will shrink more near the surface, where the concrete dries more easily, than farther in where drying starts later. Thereby a stressed central zone C and a tension edge zone D will arise, which will be seen from the cross section of a concrete pillar shown in cross section in Figure 2. It is true that the edge zone D has shrunk, but not so much as usual on account of resistance from the less dried and therefore less shrunk central portions of the concrete pillar. The cast-in measuring cell indicates pressure, but should indicate tension, as tensile stresses prevail in the edge zone. Thus, the cell indicates incorrectly, and in this case so incorrectly that pressure is indicated instead of prevailing tension.

The examples cited illustrate why there is no stress meter available on the market suitable to be embedded in the concrete and similar material when poured, i.e. cast, and why it occurs so seldom that one can check, by means of cast-in measuring cells, how the calculated stresses agree with the real stresses prevailing in the finished structure, and also how the stresses change in the course of time.

This invention relates to a device in which a stress meter is caused to function in such a way that it only records real stresses in the material and not stresses due to the material sticking (P in Figure 1), and the invention is substantially characterized in that a stress meter or measuring cell, which is intended to be embedded in the concrete structure when cast, the stresses of which are to be measured, is surrounded by a ring or a disc of a material preferably of substantially the same elastic modulus and temperature expansion coefficient as the measuring cell, the said ring absorbing the tension due to the material adhering, so that the cell is rendered free of these forces.

If such a measuring device is embedded in the edge zone D in the pillar shown in Figure 2, it will record tension, as it should, and not pressure.

Thus, the present invention is principally characterized by the fact that a measuring cell known per se is surrounded by a ring of a material preferably of the same modulus of elasticity and temperature expansion coefficient as the cell. It can also be so expressed that the invention consists of a disc in which a hole has been bored through which the measuring cell is introduced. When the height and the diameter of the measuring cell are 10 mm., the greatest diameter of the ring should be 2-5 cm. Still larger rings are somewhat better as far as the desired effect is concerned, but then the measuring points cannot be located near enough to each other in the structure. Even a ring of a diameter of 5 cm. will eliminate all irrelevant tension, except about 1%, and therefore such a ring is fully satisfactory from a practical point of view. The thickness of the middle portion of the ring or the disc is preferably equal to the height of the measuring cell, but the disc need not therefore be of even thickness. The ring or disc may be divided into different concentric rings of different properties, located close to each other or somewhat apart. The ring or disc may be massive or perforated or made of sintered powdered material for example iron and/or nickel or a suitable alloy.

The example of the shrinking concrete pillar, shown in Figure 2, and other examples illustrate cases when particularly great errors occur, when using stress meters of the type used today for measurements in shrinking, expanding or plasticizing material, errors which as a rule are inherent in concrete building material. Even in such cases when the measurements of stresses are carried out in materials without such properties the ring is of great importance.

A significant advantage of having the ring or disc around the measuring cell proper is namely that the measuring cell need not have the same stiffness as the material in which measurements are carried out.

An important condition for correct measurements of stress in solid materials is that the modulus of elasticity of the measuring cell, $E_c$, is as near as possible to the $E$-value=$E_m$ of the surrounding material. Otherwise a certain incorrect recording will occur which will depend on the relation $$\frac{E_c}{E_m}$$

In many materials, for example concrete, it is not possible to foretell particularly precisely what $E_m$-value the solidified concrete is to have. A great and unique advantage of the ring according to this invention, from the viewpoint of general stress measurement, is that the recording to a measuring cell embedded in a concrete mass at the time of molding, will to an essential degree be independent of $$\frac{E_c}{E_m}$$

In the case of $E_c \neq E_m$ an edge sticking or adhering will occur (see Figure 1), when the outer load $p$ kg./cm.² presses together the mass between the layers $a$—$a$ and $b$—$b$, which sticking gives an additional pressure in the points $a'$ and $b'$, a load which is not real stress in the structure but only a local stress on the cell. The recording thereof involves an incorrect measurement of the stresses in the structure. In such a case when the mass around the cell is softer than the cell, an additional pressure on the cell is obtained in the points $a'$ and $b'$, in the reverse case an additional tensile force in the said points. There may occur great difference between the value of the stress measured and the real value, a difference which may be difficult to compensate for, as it cannot be accurately stated how the mass around the cell changes its E-value in course of time. All such disadvantages are eliminated by using a measuring cell with a ring. The same type of measuring cell can of course be used for measuring the stresses in material of different stiffness, which involves a great practical advantage when manufacturing cells and using them in practice.

It may also be added that upon changes of temperature in a structure the ring will provide protection by eliminating the additional stresses or too low tensions which otherwise must occur in the cell as soon as the coefficient of expansion of the cell material and that of the concrete around the cell differs.

For example, by using the theories of Bousinesq concerning the distribution of stresses in solid bodies it is possible to state mathematically the manner of function of the rings according to this invention. A synopsis will be given why the rings function in the way mentioned.

According to Figure 1 it is the shrinking, plasticizing material, for instance concrete, that causes the compression forces on the cell. If the measuring cell B in Figure 1 is surrounded by a ring E of the same modulus of elasticity as the cell, the concrete will not adhere to the cell itself, but attaches, as per Figure 3, instead at the edge of the ring. The forces P have the greatest intensity in the edge of the ring, where theoretically they are infinite, but are also distributed somewhat inwards from the edge. However, if the ring is made sufficiently wide, the tension forces will practically not reach the cell B, and therefore the cell will not record the shrinking stress. The cell B records the real stresses which actuate the concrete body in the direction of action of the cell B, but it is not actuated any longer by such movements of the ambient concrete material, as may result in swelling, shrinking, or plastic deformation. If, on the other hand the said latter movements of the material in turn cause real stresses in the structure, for example when the outer layer of a beam or a pillar of concrete shrinks more than portions located farther in from the surface, the cell also records these additional stresses in the same way as, and together with, the other real stresses in the structure. The ring in fact provides the measuring device with a discriminating characteristic, so that it chooses to record all real stresses in the structure, but does not record such loads that are local stress concentrations on the cell through tension caused by shrinking, expansion, plasticization of the building material or lack of agreement between $E_c$ and $E_m$ and also between the coefficients of temperature expansion of the cell and of the ambient material.

Figure 4 shows the result of a practical experiment in proof of the fact that a cast-in measuring cell in accordance with the present inventive concept actually does eliminate measuring errors attributable to shrinking of the concrete mass. The ordinates in Fig. 4 are in units of kg./cm.² and represent the read-off tension in a cast-in tension cell. The abscissa represents the time of shrinking. Curve "A" in Fig. 4 indicates the cell readings obtained when the cast-in cell was not enclosed by the disc or ring and curve "B" indicates the cell readings obtained when the cast-in cell was enclosed by the ring or disc in accordance with the present inventive concept. For corresponding conditions the cell readings in curve "B" are obviously much lower than those in curve "A" and hence are proof that the rings or discs do practically eliminate errors in measurement of the real stresses.

In practice, the rings or discs surrounding the measuring cell may take various practical forms. In Fig. 3, already referred to, the disc E is of cylindrical configuration. In Fig. 5, which like Fig. 3 is a view in central vertical section, the disc is also of cylindrical configuration and is constituted by an inner ring E1 enclosing the measuring cell B at the center of the ring, an intermediate ring E2 surrounding and contiguous to the inner ring E1, and an outer ring E3 surrounding and contiguous to the intermediate ring E2.

Fig. 6, also a view in central vertical section of the disc or ring E4 shows a circular configuration in a horizontal plane and a substantially elliptical configuration in the vertical plane with the outer periphery squared off in the vertical plane, the cell B being at the center.

Fig. 7, also a view in central vertical section of the disc E5 shows a circular configuration in the horizontal plane and a polygonal configuration in the vertical plane.

Fig. 8, also a view in central vertical section of the disc E6 shows a circular configuration in the horizontal plane and a double concave curvature in the vertical plane.

Fig. 9, also a view in central vertical section of the disc E7 shows a circular configuration in the horizontal plane and a double T configuration in the vertical plane.

Figs. 10 and 11 are views in plan and vertical section, respectively, of a still further embodiment wherein the disc E8 is provided with openings in the form of channels 2 for the purpose of reducing the weight of volume and modulus of elasticity of the ring. Alternatively, these openings can be in the form of cavities.

Having now described my invention what I claim as new and desire to secure by Letters Patent is:

1. In a cast-in device for measuring the stresses in cast building materials such as concrete, the combination comprising a disc having a central opening extending therethrough and a measuring cell disposed within the central opening in said disc and the height of said disc at the center thereof being substantially equal to the height of said cell, said disc having substantially the same modulus of elasticity and substantially the same coefficient of temperature expansion as said cell whereby said disc serves to render said measuring cell nonresponsive to local stresses which arise from the material near and around said cell and disc due to the fact that the E-value of the loaded material differs from that of said cell or due to shrinking, swelling or plasticising of the material.

2. A cast-in device as defined in claim 1 for measuring stresses wherein said disc is comprised of a plurality of concentric annular sections contiguous to each other.

3. A cast-in device as defined in claim 1 for measuring stresses wherein said disc is constituted by a sintered metal powder.

4. A cast-in device as defined in claim 3 for measuring stresses wherein said sintered metal powder is iron.

5. A cast-in device as defined in claim 3 for measuring stresses wherein said sintered metal powder is a combination of iron and nickel.

6. A cast-in device as defined in claim 3 for measuring stresses wherein said sintered metal powder is nickel.

7. A cast-in device as defined in claim 1 for measuring stresses wherein said disc includes openings for the purpose of reducing the modulus of elasticity thereof.

References Cited in the file of this patent

UNITED STATES PATENTS

| | | |
|---|---|---|
| 642,978 | Haase | Feb. 6, 1900 |
| 1,708,333 | Smith | Apr. 9, 1929 |
| 2,036,458 | Carlson | Apr. 7, 1936 |
| 2,050,186 | Klemperer | Aug. 4, 1936 |
| 2,148,013 | Carlson | Feb. 21, 1939 |

FOREIGN PATENTS

| | | |
|---|---|---|
| 262,587 | Switzerland | July 15, 1949 |